United States Patent
Morishita et al.

(10) Patent No.: US 10,754,426 B2
(45) Date of Patent: Aug. 25, 2020

(54) TERMINAL DEVICE, PROGRAM, METHOD, AND SYSTEM

(71) Applicant: GungHo Online Entertainment, Inc., Tokyo (JP)

(72) Inventors: Kazuki Morishita, Tokyo (JP); Ken Narita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 0 days.

(21) Appl. No.: 16/249,141

(22) Filed: Jan. 16, 2019

(65) Prior Publication Data

US 2020/0057497 A1 Feb. 20, 2020

Related U.S. Application Data

(63) Continuation of application No. PCT/JP2018/030664, filed on Aug. 20, 2018.

(51) Int. Cl.
```
G06F 3/01        (2006.01)
G06F 3/041       (2006.01)
A63F 13/2145     (2014.01)
A63F 13/212      (2014.01)
A63F 13/48       (2014.01)
```

(52) U.S. Cl.
CPC ............. *G06F 3/015* (2013.01); *A63F 13/212* (2014.09); *A63F 13/2145* (2014.09);
(Continued)

(58) Field of Classification Search
CPC ...... G06F 3/015; G06F 3/0416; A63F 13/212; A63F 13/2145; A63F 13/48;
(Continued)

(56) References Cited

U.S. PATENT DOCUMENTS

2015/0273339 A1* 10/2015 Lavery .................... A63F 13/00
                                                    463/29
2016/0282940 A1    9/2016 Hong et al.
2017/0102697 A1*   4/2017 Hassan ................... G06F 1/163

FOREIGN PATENT DOCUMENTS

JP    2005-085174 A    3/2005
JP    2007-202882 A    8/2007
(Continued)

OTHER PUBLICATIONS

Kawamura, Hitoshi et al.: "A Research Electromyographic of Reaction Time (No. 1)", Bulletin of Aichi Institute of Technology, No. 7, pp. 33-43, issued on Mar. 30, 1972 (13 pages).
(Continued)

*Primary Examiner* — Peter D McLoone
(74) *Attorney, Agent, or Firm* — Harness, Dickey & Pierce, P.L.C.

(57) ABSTRACT

A terminal device including: an input interface configured to receive an operation input by a user; an external communication interface configured to receive intention information of the user who performs the operation input from a sensor device, the sensor device being configured to detect intention of the user with respect to the operation input; a memory configured to store computer-readable instructions; and a processor configured to execute the computer-readable instructions so as to: identify the operation input which the user is going to perform based on the intention information before the input interface receives the operation input; start a process corresponding to the identified operation input; and perform a process corresponding to the operation input received by the input interface by using information relating to the already started process corresponding to the identified operation input when the input interference receives the operation input.

15 Claims, 8 Drawing Sheets

(52) U.S. Cl.
CPC ............ *G06F 3/0416* (2013.01); *A63F 13/48* (2014.09); *A63F 2300/1012* (2013.01); *A63F 2300/1075* (2013.01); *A63F 2300/636* (2013.01)

(58) Field of Classification Search
CPC ...... A63F 2300/1012; A63F 2300/1075; A63F 2300/636
See application file for complete search history.

(56) References Cited

FOREIGN PATENT DOCUMENTS

| | | |
|---|---|---|
| JP | 2010-051356 A | 3/2010 |
| JP | 2013-128642 A | 7/2013 |
| JP | 2014-174880 A | 9/2014 |
| JP | 2015-156912 A | 9/2015 |
| JP | 2016-179164 A | 10/2016 |
| JP | 2017-202183 A | 11/2017 |
| JP | 2018-025888 A | 2/2018 |

OTHER PUBLICATIONS

Komazaki, Masanobu; "A Study of Human Pointing Features on Touch-Screens", doctoral thesis at the University of Electro-Communications, Sep. 2008 (194 pages).

Japanese Office Action for Application No. 2018-544286 dated Oct. 23, 2019 with English translation (10 pages).

"MUV-LUV Alternative", Official Mechanism Setting Material Collection MUV-LUV Alternative Integral Works, with English translation, Japan, Enterbrain, Inc., Mar. 26, 2010, p. 118.

\* cited by examiner

| OPERATION INPUT ID | FEATURE | DETAILED OPERATION |
|---|---|---|
| O1 | T1 | TOUCH |
| O2 | T2 | LONG PRESS |
| O3 | T3 | SWIPE |
| O4 | T4 | DOUBLE TOUCH |
| O5 | T5 | PRESS DOWN HARDKEY |
| ... | ... | ... |

| ICON ID | DRAWING DATA | PLACEMENT COORDINATES | PROCESS |
|---|---|---|---|
| I1 | G1 | C1 | P1 |
| I2 | G2 | C2 | P2 |
| I3 | G3 | C3 | P3 |
| I4 | G4 | C4 | P4 |
| I5 | G5 | C5 | P5 |
| ... | ... | ... | ... |

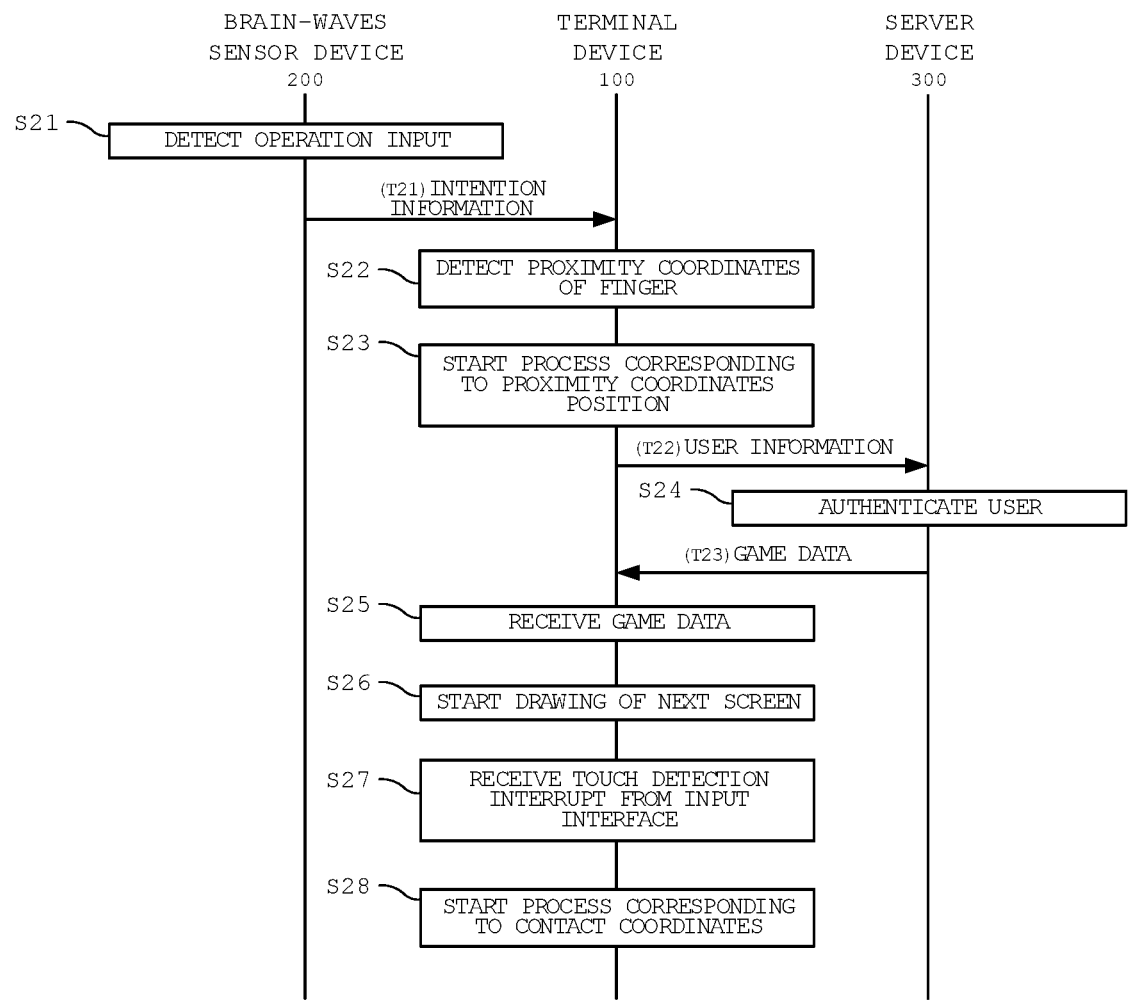

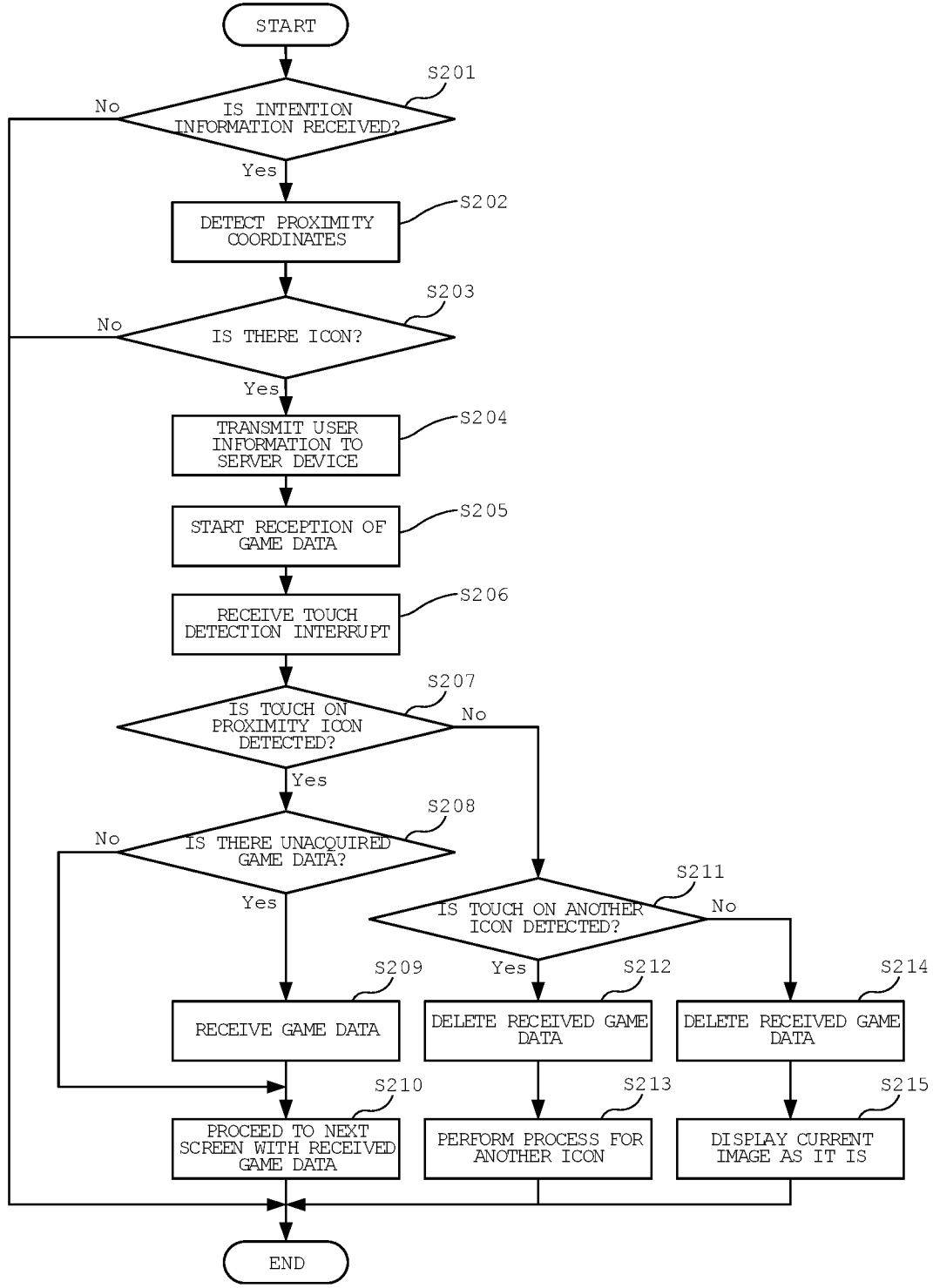

TERMINAL DEVICE, PROGRAM, METHOD, AND SYSTEM

CROSS-REFERENCE TO RELATED APPLICATION

The present application is a continuation application of International Application No. PCT/JP2018/030664, filed on Aug. 20, 2018, which is expressly incorporated herein by reference in its entirety.

BACKGROUND

1. Technical Field

The present disclosure relates to a terminal device, a program, a method, and a system using detected intention of a user.

2. Related Art

When a person receives an external stimulus, the person perceives the stimulus with a sensory receptor, determines the stimulus, designs what to do, and finally contracts a peripheral muscle and performs an operation. It is known that a time period of 200 milliseconds is generally required from the stimulus to the operation even in a situation where there is no load (Hitoshi KAWAMURA, et al., "A Research Electromyograhic of Reaction Time (No. 1)", Bulletin of Aichi Institute of Technology, No. 7, pp 33-43, issued on Mar. 30, 1972). For example, in an operation of a terminal device typified by a smartphone, since the terminal device is operated under a situation where a person receives various stimuli from other than the terminal device and the determination of the stimuli is required, it is easily considered that a time period of 200 milliseconds or more is required from reception of some stimulus from a display to provision of an instruction input.

In input interfaces, even after contracting a muscle and starting an operation, it is necessary to do tasks such as moving a finger or a mouse, positioning, and touching (clicking), and it is known that a time period of 200 milliseconds to 1200 milliseconds is required for completing all the tasks (Masanobu KOMAZAKI, "A Study of Human Pointing Features on Touch-Screens", doctoral thesis at the University of Electro-Communications, September, 2008).

Meanwhile, it is conventionally known that it is possible to detect brain waves of a user, to measure intention of the user based on the measured brain waves, and to operate various devices. For example, JP 2015-156912 A describes measuring user's caution areas and the degree of caution with user's brain waves and controlling a movement direction and speed of an electric wheelchair.

SUMMARY

Therefore, in view of the above-described technique, various embodiments of the present disclosure provide a terminal device, a program, a method, and a system that make it possible to start a process in the terminal device in advance by using a time period from designing what operation the user performs on the terminal device until the operation is completed, and to further reduce a time period from the moment when the operation input is actually performed into the terminal device until the process is completed.

One aspect of the present disclosure provides "a terminal device comprising: an input interface configured to receive one or more operation inputs by a user; an external communication interface configured to receive intention information of the user who performs at least one operation input from a sensor device connected with a cable or wirelessly, the sensor device enabling detection of the intention of the user; a memory configured to store computer-readable instructions; and a processor configured to execute the computer-readable instructions so as to: identify the operation input which the user is going to perform based on the intention information received by the external communication interface in response to the instruction before the input interface receives the at least one operation input; start a process corresponding to the identified operation input; and when the input interface receives the operation input, perform a process corresponding to the operation input received by the input interface by using information already processed based on the intention information."

One aspect of the present disclosure provides "a computer program product embodying computer-readable instructions stored on a non-transitory computer readable medium for causing a computer to execute a process by a processor, the computer comprising: an input interface configured to receive one or more operation inputs by a user; and an external communication interface configured to receive intention information of the user who performs at least one operation input from a sensor device connected with a cable or wirelessly, the sensor device enabling detection of the intention of the user; the computer configured to perform the steps of: identifying the operation input the user is going to perform based on the intention information received by the external communication interface in response to the instruction before the input interface receives the at least one operation input; starting a process corresponding to the identified operation input; and when the input interface receives the operation input, performing a process corresponding to the operation input received by the input interface by using information already processed based on the intention information."

One aspect of the present disclosure provides "a method for causing a processor in a computer to execute computer-readable instructions stored in a memory, the computer comprising; an input interface configured to receive one or more operation inputs by a user; and an external communication interface configured to receive intention information of the user who performs at least one operation input from a sensor device connected with a cable or wirelessly, the sensor device enabling detection of the intention of the user; and a memory configured to store the instruction; the method comprising executing the computer-readable instructions on the processor the steps of: identifying the operation input the user is going to perform based on the intention information received by the external communication interface before the input interface receives the at least one operation input; starting a process corresponding to the identified operation input; and when the input interface receives the operation input, performing a process corresponding to the operation input received by the input interface by using information already processed based on the intention information."

One aspect of the present disclosure provides "a system comprising: any one of the terminal device; and a sensor device connected to the terminal device with a cable or wirelessly, the sensor device enabling detection of the intention of the user who performs one or more operation inputs into the input interface of the terminal device."

One aspect of the present disclosure provides "a terminal device comprising: an input interface configured to receive one or more operation inputs by a user; an external communication interface configured to receive a signal indicating intention of the user detected by one or more electrodes connected with a cable or wirelessly; a memory configured to store a computer-readable instructions and a correspondence between the signal and the intention of the user; and a processor configured to execute the computer-readable instructions so as to: generate intention information of the user from the received signal and the correspondence stored in the memory in response to the instruction before the input interface receives the operation input; identify the operation input the user is going to perform based on the generated intention information; start a process corresponding to the identified operation input; and when the input interface receives the operation input, perform a process corresponding to the operation input received by the input interface by using information already processed based on the intention information."

Various embodiments of the present disclosure can provide a terminal device, a program, a method, and a system that make it possible to start a process in the terminal device in advance by using a time period from designing what operation the user performs on the terminal device until the operation is completed, and to reduce a time period from the moment when the operation input is actually performed into the terminal device until the process is completed.

Note that the above-described effect is illustrative for convenience of description and is not restrictive. In addition to or in place of the above-described effect, it is also possible to produce any effect described in the present disclosure and an effect apparent to a person skilled in the art.

BRIEF DESCRIPTION OF THE DRAWINGS

FIG. 9 is a diagram showing a process sequence to be executed among the terminal device, a brain-waves sensor device, and a server device according to the second embodiment of the present disclosure.

FIG. 10 is a diagram showing a process flow to be executed by the terminal device according to the second embodiment of the present disclosure.

DESCRIPTION OF EXEMPLARY EMBODIMENTS

Figure 1:
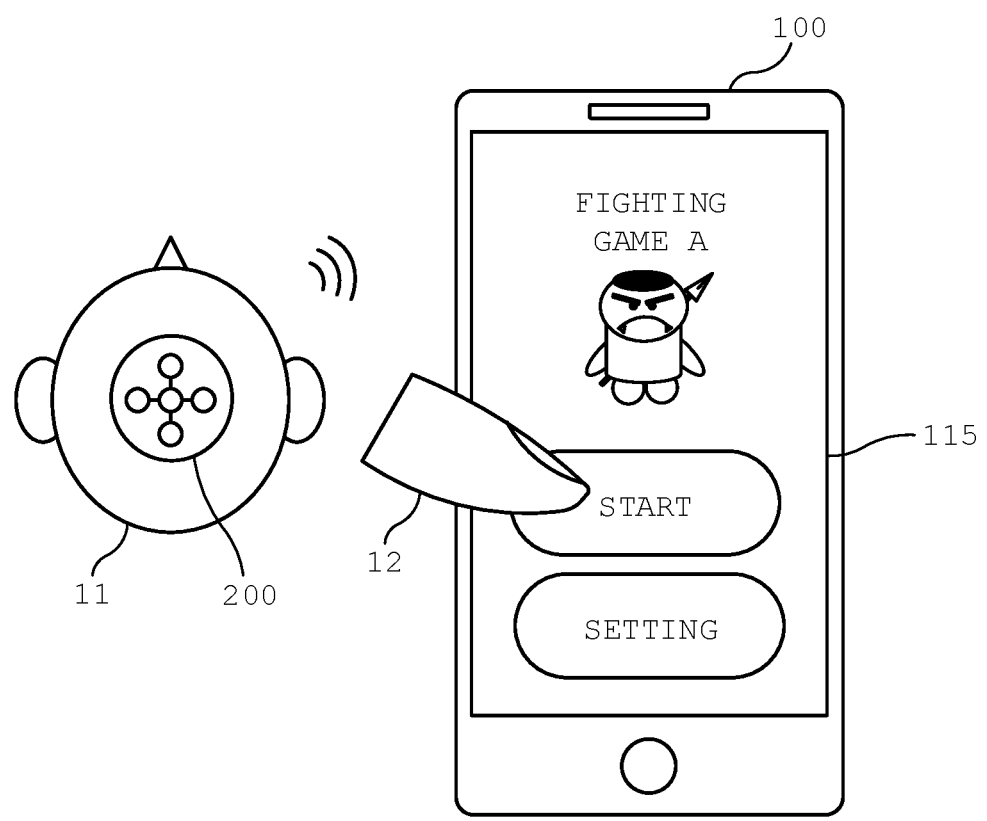
FIG. 1 is a diagram conceptually showing a process in a system according to various embodiments of the present disclosure.

Various embodiments of the present disclosure will be described with reference to the accompanying drawings. Note that common components in the drawings are denoted with the same reference signs.

OUTLINE OF SYSTEM ACCORDING TO THE PRESENT DISCLOSURE

FIG. 1 is a diagram conceptually showing a process in a system according to various embodiments of the present disclosure. According to FIG. 1, the system detects intention of a user 11 to perform an operation input, based on brain waves detected by a brain-waves sensor device 200 attached to the user 11. Based on the detection result, the system starts a process corresponding to the operation the user 11 is going to input before the user actually performs the operation input into an input interface (touch sensor 115). When the operation input is actually performed, the system performs the operation sequentially by using the already started process as it is.

As one example, when the brain-waves sensor device 200 attached to the user 11 detects intention of the user 11 to press down a start icon through the touch sensor 115, before the user 11 actually performs the operation input into the touch sensor 115, the system starts communication with a server device 300 in advance and transmits and receives necessary information. Then, when the operation input is actually performed into the touch sensor 115 by an indicator 12 of the user 11 (finger), continuation of the information transmitted and received in advance is transmitted and received continuously. This makes it possible to effectively utilize a time period from the brain's determination to perform the operation input until the actual contraction of a peripheral muscle and operation, and to reduce a time period from perception that the operation is completed until the process is completed.

Note that the present disclosure has mentioned a case where information is transmitted and received to and from the server device 300 in response to the operation input of the user 11 as an example of "the process." However, "the process" is not limited to this case, and it is possible to apply the system according to the present disclosure to any process if the process requires a certain time period. Other examples of the process include drawing processing on a display screen, authentication processing of the user or other person, and activation processing of each application.

First Embodiment

Figure 2:
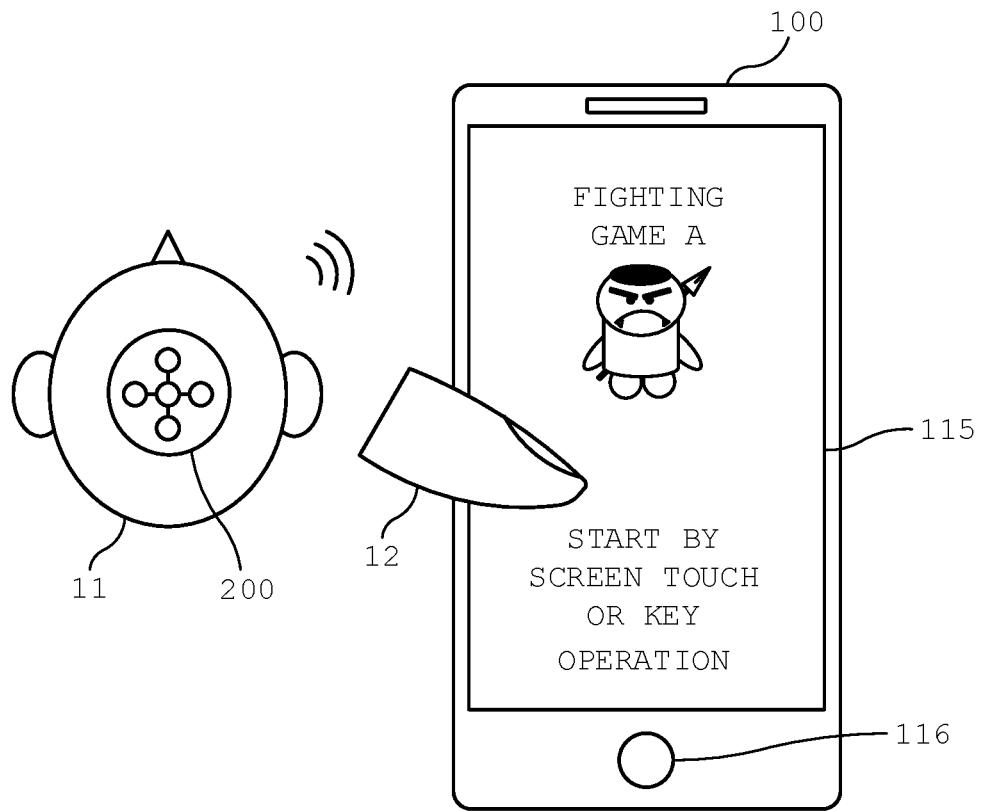
FIG. 2 is a diagram conceptually showing the process in the system according to the first embodiment of the present disclosure.

1. Configuration of a System 1 According to a First Embodiment of the Present Disclosure FIG. 2 is a diagram conceptually showing a process in the system according to the first embodiment of the present disclosure. According to FIG. 2, when a brain-waves sensor device 200 attached to a user 11 detects intention of the user 11 to touch a screen of a touch sensor 115 or to press down a hardkey 116, the system starts communication with a server device 300 in advance before an operation input is actually performed, and transmits and receives necessary information. Then, when an indicator 12 of the user 11 (finger) actually touches the touch sensor 115 or presses down the hardkey 116, the system continuously transmits and receives continuation of the information transmitted and received in advance. This makes it possible to effectively utilize a time period from the brain's determination to perform the operation input until the actual contraction of a peripheral muscle and operation, and to reduce a time period from perception that the operation is completed until the process is completed.

Figure 3:
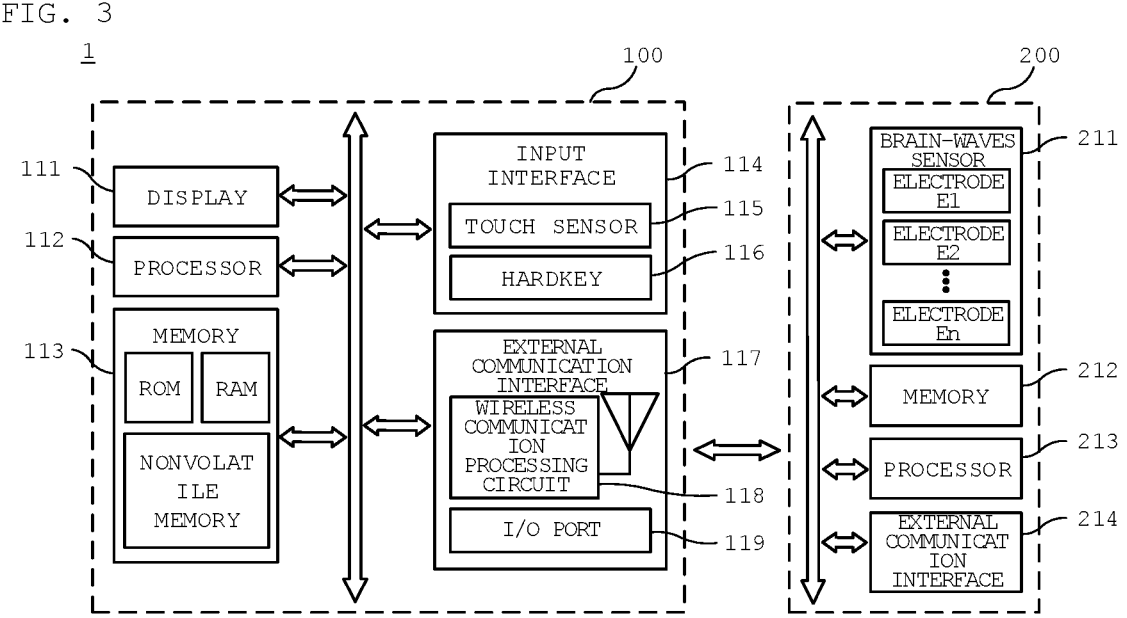
FIG. 3 is a block diagram showing an example of a configuration of the system according to the first embodiment of the present disclosure.

FIG. 3 is a block diagram showing an example of a configuration of the system 1 according to the first embodiment of the present disclosure. With reference to FIG. 3, the system 1 includes a terminal device 100 and the brain-waves sensor device 200 communicatively connected to the terminal device 100 with a cable or wirelessly. The terminal device 100 and the brain-waves sensor device 200 do not need to include all components shown in FIG. 3. Part of the components may be omitted, and other components may be added.

Examples of the terminal device 100 include a wirelessly communicative portable terminal device typified by a smartphone. In addition to the portable terminal device, the system 1 according to the present embodiment is suitably applicable to a device that allows input and output of information with other devices or other modules and allows an operation input by the user, such as a portable game machine, a feature phone, a portable information terminal, a personal digital assistant (PDA), a laptop personal computer (PC), a desktop PC, a non-portable game machine, a music player, a printing device such as a multifunctional printer and a laser printer, a manual operating device for a machine such as a machine tool and a manufacturing machine, a car navigation system, and a vehicle-mounted device for an automobile and the like.

According to FIG. 3, the terminal device 100 includes a display 111, a processor 112, a memory 113, an input interface 114 including the touch sensor 115 and the hardkey 116, and an external communication interface 117 including a wireless communication processing circuit 118 connected to an antenna and an I/O port 119. These components are electrically connected to each other via a control line and a data line.

The display 111 functions as a display unit that reads image information stored in the memory 113 and performs various displays in response to an instruction from the processor 112. Specifically, the display 111 displays, for example, a title screen for receiving a start operation from the user in a screen immediately after activation of a game application in an example of FIG. 2. Although not particularly illustrated, when the display 111 receives an operation input into the touch sensor 115 or the hardkey 116 in the title screen, the display 111 displays a start screen of the game application. The display 111 includes, for example, a liquid crystal display.

The processor 112 includes a CPU (microcomputer), and functions as a control unit that controls other connected components based on various programs stored in the memory 113. The processor 112 processes instructions stored in the memory 113, that is, a program for executing the game application or a program for executing an operating system (OS) according to the present embodiment.

Specifically, based on intention information indicating intention of the user to "perform an operation input" received from the brain-waves sensor device 200, the processor 112 performs a process corresponding to operation information identified by the intention information before the input interface 114 actually receives the operation input of the user. When the input interface 114 actually receives the operation input of the user, the processor 112 performs the process corresponding to the operation information identified by the operation input. At this time, when the processor 112 has already started the process based on the intention information, the processor 112 performs the process by using the already processed information as it is. Note that the processor 112 may include a single CPU, or may include a plurality of CPUs. The processor 112 may appropriately include a combination of other types of processors such as a graphical processing unit (GPU) that takes charge of image processing.

The memory 113 includes a random-access memory (RAM), a read-only memory (ROM), or a nonvolatile memory (hard disk drive (HDD) in some cases) and functions as a storage unit. The ROM stores the instructions for executing an application or an OS according to the present embodiment as a program. The RAM is a memory to be used for writing and reading data while the processor 112 processes the program stored in the ROM. The nonvolatile memory is a memory for writing and reading data by executing the program, and the data written in the nonvolatile memory is saved even after the execution of the program is finished. Although not particularly illustrated in the present embodiment, details of processes to be executed when each operation input is detected are stored in association with each operation input (touch, long press, swipe, and press down the hardkey). In addition, for example, an icon table is stored in the memory 113 as necessary.

The input interface 114 includes the touch sensor 115 and the hardkey 116, and functions as an input unit for receiving various operation inputs from the user. The touch sensor 115 is used for receiving various operation inputs from the user, such as an operation of an icon displayed on the display 111 and input of a character string by the user. The touch sensor 115 is disposed to cover the display 111, and outputs information on proximity coordinates and contact coordinates of the indicator 12 (user's finger, stylus, and the like) corresponding to image data displayed by the display 111. As a touch sensor scheme, known schemes can be used, such as the resistive film scheme, the capacitance coupling scheme, and the ultrasonic surface acoustic wave scheme. In the present embodiment, in order to detect the proximity of the indicator 12 of the user as well, it is preferable to use the touch sensor 115 of the capacitance coupling scheme. A known hardkey can be used as appropriate for the hardkey 116.

The external communication interface 117 includes the wireless communication processing circuit 118, the antenna connected to the wireless communication processing circuit, and the I/O port 119, and functions as a communication unit. The external communication interface 117 transmits and receives data such as a program, user information, and drawing information necessary for execution of various applications to and from the server device 300 remotely installed and connected over a network. Particularly in the present embodiment, the external communication interface 117 receives the intention information of the user who performs an operation input from the brain-waves sensor device.

The wireless communication processing circuit 118 and the antenna perform processes based on the broadband wireless communication scheme typified by the wideband-code division multiple access (W-CDMA) scheme and the long term evolution (LTE) scheme. The wireless communication processing circuit 118 and the antenna can also perform processes based on the narrow-band wireless communication scheme such as a wireless local area network (LAN) typified by IEEE 802.11 and Bluetooth (registered trademark).

The I/O port 119 is connected to an I/O port of an external device connected with a cable. As the I/O port 119, a desired connection form can be employed such as a serial port, a parallel port, and a universal serial bus (USB).

Note that in the present embodiment, various information items including intention information are transmitted and received to and from the brain-waves sensor device 200. This transmission and reception may be performed by any of wireless communication via the wireless communication processing circuit 118 and cable communication via the I/O port 119. When using the terminal device 100 according to the present embodiment, it takes a time period of 200 milliseconds or more for a sensory receptor to perceive a stimulus (recognize information displayed on the display 111), to determine the stimulus, to determine an operation input, and to finally contract and operate a peripheral muscle (operation input into the touch sensor 115). Therefore, in consideration of this time period, the communication scheme with the brain-waves sensor device 200 is more preferable as the transmission speed increases, but it is necessary to at least secure the transmission speed equal to or faster than a certain speed, and it is possible to select the communication scheme as appropriate from a viewpoint of communication stability and speed.

According to FIG. 3, the brain-waves sensor device 200 includes a brain-waves sensor 211 including one or more electrodes E1 to En, a memory 212, a processor 213, and an external communication interface 214. These components are electrically connected to each other via a control line and a data line.

The brain-waves sensor 211 includes the one or more electrodes E1 to En. It is known that in the brain, the cerebral cortex generally takes charge of each function, such as perception, voluntary movement, thinking, and reasoning, and furthermore, each part of the cerebral cortex plays a different role. For example, in order to perform an operation input of the terminal device 100 with a finger, functions of the orbitofrontal cortex, the movement association area, and the primary motor area are needed. Therefore, the electrodes E1 to En are disposed at positions on a scalp corresponding to these active parts. Note that the placement and the number of electrodes E1 to En can also be determined by sampling the brain waves of the user by using the brain-waves sensor device 200 in advance, and appropriately selecting the electrode that detects the strongest peak observed when the operation into the input interface 114 is performed. Analog signals output from the electrodes E1 to En are appropriately converted into digital signals and used for subsequent processes.

The memory 212 includes a RAM, a ROM, or a nonvolatile memory, and functions as a storage unit. The ROM stores instructions for executing control of the brain-waves sensor 211 or transmission and reception of information to and from the terminal device 100 according to the present embodiment as a program. The RAM is a memory to be used for writing and reading data while the processor 213 processes the program stored in the ROM. The nonvolatile memory is a memory for writing and reading data by executing the program, and the data written in the nonvolatile memory is saved even after the execution of the program is finished. In the present embodiment, for example, an operation identifying table (FIG. 4) is stored in the memory 212.

The processor 213 includes a CPU (microcomputer), and functions as a control unit that controls other connected components based on various programs stored in the memory 212. The processor 213 processes the program for executing the instructions stored in the memory 212. Specifically, the processor 213 refers to a brain-waves signal output from the brain-waves sensor 211 and the operation identifying table, determines a point of agreement with a feature of the brain-waves signal sampled in advance, and determines what kind of operation the user is going to input.

The external communication interface 214 functions as a communication unit to be used for transmission and reception of information to and from the terminal device 100. Therefore, corresponding to the external communication interface 117 of the terminal device 100, the external communication interface 214 appropriately includes the wireless communication processing circuit 118, the antenna connected to the wireless communication processing circuit, and the I/O port 119.

2. Information Stored in Memory 212

Figures 4, 5:
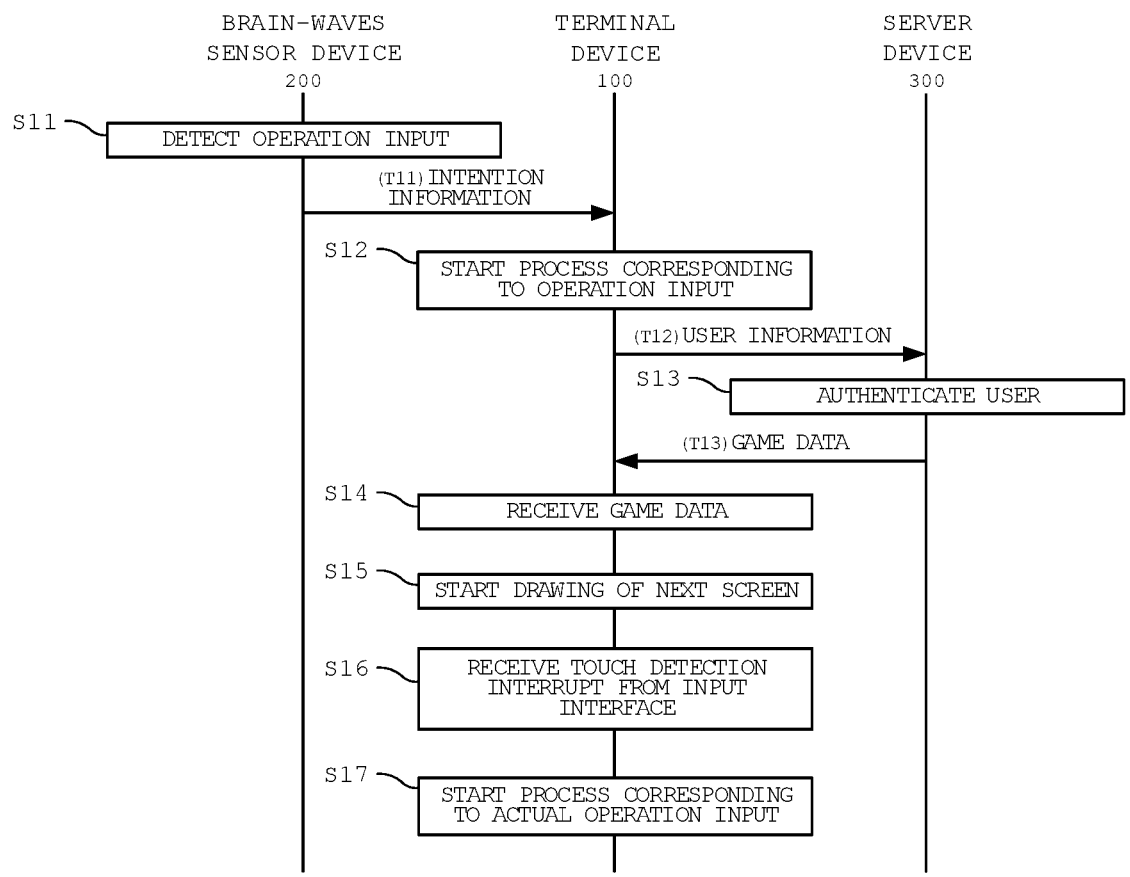
FIG. 4 is a diagram conceptually showing an operation identifying table stored in a memory of a brain-waves sensor device according to the first embodiment of the present disclosure.
FIG. 5 is a diagram showing a process sequence to be executed among a terminal device, the brain-waves sensor device, and a server device according to the first embodiment of the present disclosure.

FIG. 4 is a diagram conceptually showing the operation identifying table stored in the memory 212 of the brain-waves sensor device 200 according to the first embodiment of the present disclosure. Specifically, a feature of the brain-waves signal when the user sampled in advance performs each operation input is stored in the table, and the table is used for determining what kind of operation the user is going to input. According to FIG. 4, feature information and detailed operation information are stored in association with each operation input ID information. The feature information is information regarding a characteristic peak during each operation input from a waveform obtained from brain waves sampled when the user performs various operation inputs into the input interface 114 in advance. The detailed operation information is information indicating detailed operation input the user is performing when each feature information is obtained. In the present embodiment, for example, the feature of the waveform of the brain waves detected by the brain-waves sensor 211 is compared with each feature stored in the operation identifying table of FIG. 4. When the feature of the waveform of the brain waves agrees with the feature information of "T1", "touch" input is identified as the detailed operation information. The operation input ID information "O1" corresponding to the "touch" input is output from the brain-waves sensor device 200 to the terminal device 100 as the intention information.

3. Process Sequence to be Executed Among Devices

FIG. 5 is a diagram showing a process sequence to be executed among the terminal device 100, the brain-waves sensor device 200, and the server device 300 according to the first embodiment of the present disclosure. Specifically, FIG. 5 is an example of the operation input to be performed when a game application of "fighting game A" shown in FIG. 2 is activated in the terminal device 100 and the title screen is displayed. FIG. 5 shows an interrupt process sequence to be started when the brain-waves sensor device 200 detects intention of the user to perform the operation input and transmits the intention information generated based on the detection. Note that FIG. 5 cites an example of transmission and reception of information to and from the server device 300 to be performed by performing the operation input in the title screen of FIG. 2. However, this is just one example. That is, a situation to cause the user to perceive is not limited to the title screen but may be other situations. Alternatively, a process in which the server device 300 is not involved may be performed, or a process in which other server devices or other terminal devices are involved may be performed.

In FIG. 5, when an initial screen is displayed, the user who has perceived this display determines into which icon of the start icon and a setting icon to perform an operation input. Then, as a result of the determination, the user determines an intention to touch the start icon and proceed to the start screen. In the meantime, the processor 213 of the brain-waves sensor device 200 monitors as required a feature of the waveform output from the brain-waves sensor 211 including the electrodes E1 to En (S11). Each time with reference to the operation identifying table shown in FIG. 4, the processor 213 determines agreement between the obtained feature and the feature of the operation input of the user sampled in advance. When there is no agreement, the processor 213 returns to the waveform monitoring process again.

On the other hand, when there is agreement about the feature, with reference to the detailed operation information associated with the agreed feature, the processor 213 identifies the detailed information about which the user is going to perform the operation input. In the present embodiment, as described above, since the intention to perform the operation input of touch on the touch sensor 115 has been determined, the operation input ID information agrees with the feature of "O1." Therefore, the processor 213 performs control to generate the intention information including at least "O1" as the operation input ID information and to transmit the intention information (T11) to the terminal device 100 via the external communication interface 214.

Next, the terminal device 100 starts a process associated in advance with touch on the touch sensor 115 in the start screen (S12). In the present embodiment, the terminal device 100 first transmits user information (T12) stored in the memory 113 to the server device 300. Then, upon receipt of the user information, the server device 300 performs a process for authenticating the user (S13). When the user is authenticated as an authorized user of the game application of "fighting game A", the server device 300 transmits game data of the user (T13) stored in the server device 300 to the terminal device 100.

The terminal device 100 sequentially receives the game data transmitted from the server device 300 (S14). When the reception of the game data is completed, the terminal device 100 starts a drawing process for displaying the start screen on the display 111 by using the received game data and drawing information on the start screen stored in the memory 113 (S15).

Next, upon receipt of a touch detection interrupt from the input interface 114 (S16), the terminal device 100 performs a process associated with the touch detection (S17). At this time, when the intention information of touch on the touch sensor 115 transmitted in T11 agrees with the actual operation input, the process of S17 is performed using a result of the process that has already started in and after S12 as it is.

Note that the present embodiment has described a case where the input interface 114 receives the touch detection interrupt after S15. However, the interrupt can be received at any timing in and after S12. Therefore, for example, when the interrupt is received after S14, the process of S17 may be resumed from the middle of reception of the game data.

The present embodiment has described a case where the intention information "touch the touch sensor 115" is received in the title screen. However, for example, even when intention information to "press down the hardkey 116" is received, it is possible to perform the similar process.

4. Process Flow to be Executed by Terminal Device 100

Figure 6:
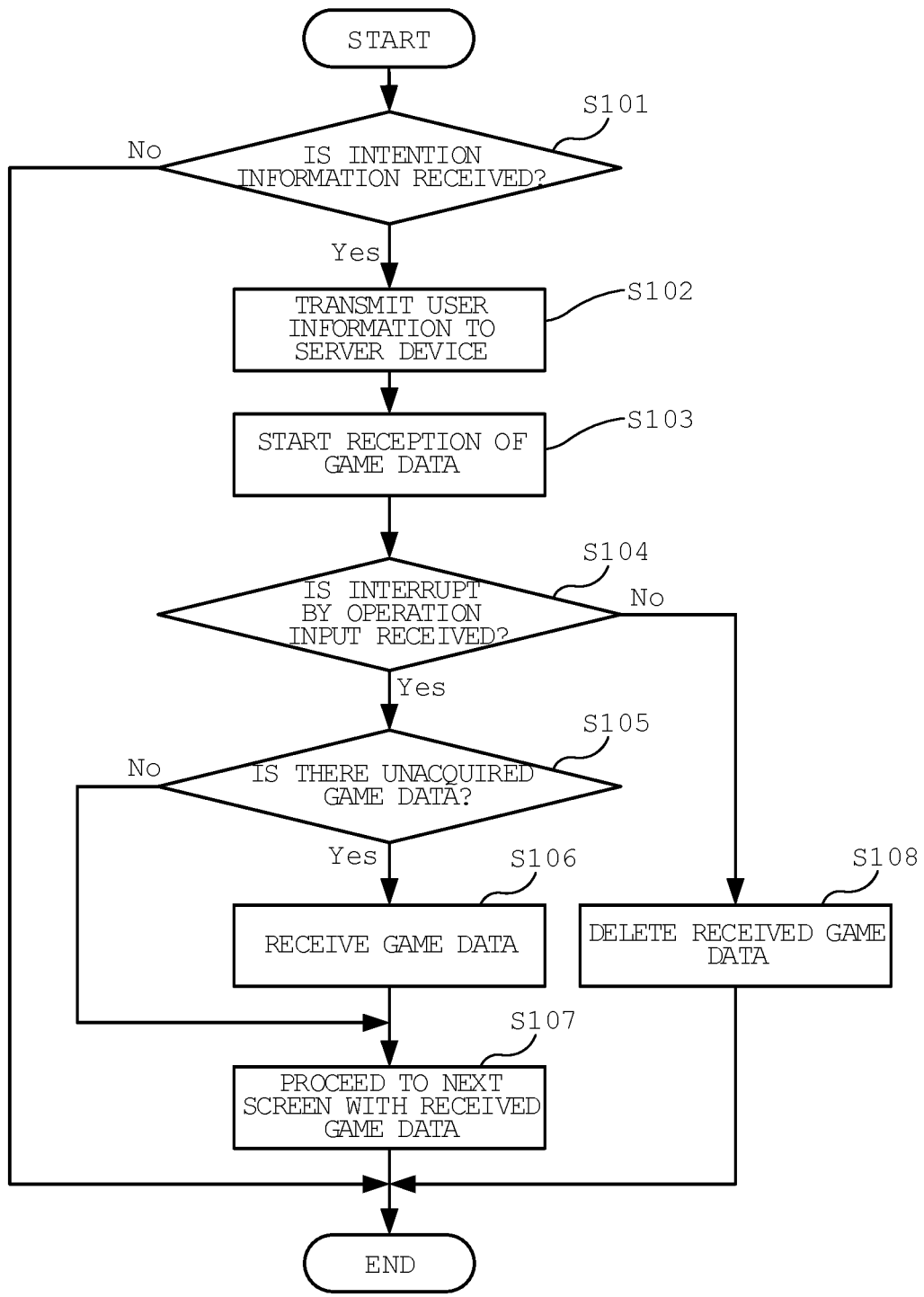
FIG. 6 is a diagram showing a process flow to be executed by the terminal device according to the first embodiment of the present disclosure.

FIG. 6 is a diagram showing a process flow to be executed by the terminal device 100 according to the first embodiment of the present disclosure. Specifically, the process flow is about the interrupt process to be started by receiving the intention information from the brain-waves sensor device 200.

According to FIG. 6, the process flow is started by determining that the processor 112 has received the intention information from the brain-waves sensor device 200 via the external communication interface 117 (S101). Then, the processor 112 identifies from the intention information that the operation input the user is going to perform is the touch on the touch sensor 115. Then, the processor 112 performs the process associated with the touch operation in the title screen. That is, in the present embodiment, before the user performs the actual operation input into the input interface, the processor 112 identifies the operation information by receiving the intention information from the brain-waves sensor device 200, and starts the process corresponding to this identified operation information in advance.

Specifically, the processor 112 first controls the external communication interface 117 to transmit the user information stored in the memory 113 to the server device 300 (S102). Then, after the server device 300 authenticates the user, the processor 112 controls the external communication interface 117 to start reception of the game data necessary for executing the game application (S103). Next, the processor 112 starts to draw the next screen (start screen) sequentially based on the received game data and the drawing information stored in the memory 113.

Here, when the input interface 114 receives the actual operation input into the touch sensor 115 by the user, the input interface 114 transmits an interrupt signal of this operation input. Upon receipt of the interrupt signal, the processor 112 identifies the operation information detected by the touch sensor 115 (S104). The present embodiment describes a case where the touch sensor 115 detects the "touch" operation in the title screen.

At this time, the processor 112 determines whether the identified operation information agrees with the operation information identified by receiving the intention information. As a result, when both are the "touch" operation into the touch sensor 115, the processor 112 determines whether there is any unacquired game data in the game data received in S103 (S105). When there is unacquired game data, the processor 112 controls the external communication interface 117 to receive the unacquired game data from the server device (S106). Then, by using both the game data received in advance based on the intention information and the game data received by actually performing the operation input, the processor 112 draws the next screen (start screen), and causes display of the display 111 to proceed to the next screen (S107).

Meanwhile, when the input interface 114 does not receive interruption, the processor 112 considers that the operation input into the touch sensor 115 has not been actually performed, and deletes the game data and the like received in advance using the intention information from the memory 113 (S108).

Note that the present embodiment has described a case where the intention information "touch the touch sensor 115" is received in the title screen. However, for example, even when intention information to "press down the hardkey 116" is received, it is possible to perform the similar process.

As described above, by detecting the intention of the user to perform the operation input by the brain-waves sensor device 200, the present embodiment makes it possible to start the process in the terminal device 100 in advance by using the time period from designing what the user operates on the terminal device 100 until the operation is completed, and to further reduce the time period from the moment when the operation input is actually performed into the terminal device until the process is completed.

Second Embodiment

The first embodiment has described a case where a terminal device proceeds to a start screen by a user touching a touch sensor 115 or pressing down a hardkey 116 on a title screen. That is, the first embodiment has described a case where a brain-waves sensor device 200 generates intention information to touch the touch sensor 115 or press down the hardkey 116. The second embodiment will describe a case of displaying a plurality of icons on the title screen, distinguishing for which icon an operation input is performed, and performing a process for the operation input. Note that the present embodiment is similar to the first embodiment in configuration, process, and procedure, except for items to be specifically described below. Therefore, detailed description of these items will be omitted.

Figures 7, 8:
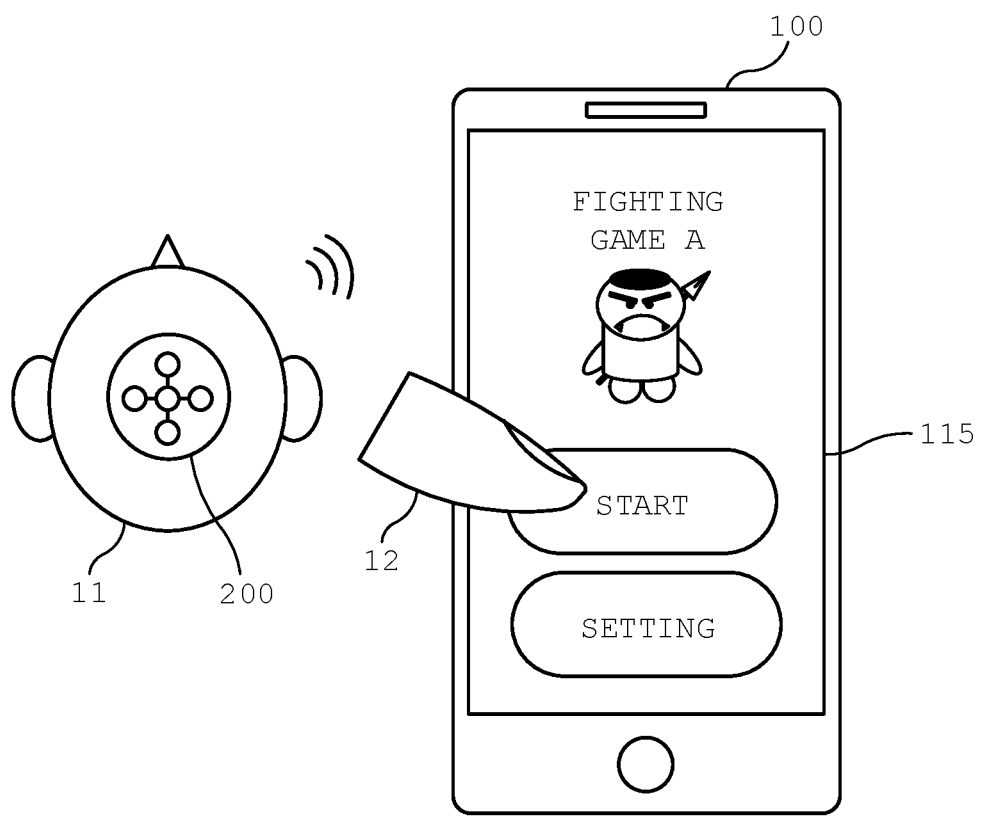
FIG. 7 is a diagram conceptually showing a process in a system according to the second embodiment of the present disclosure.
FIG. 8 is a diagram conceptually showing an icon table stored in a memory of a terminal device according to the second embodiment of the present disclosure.

FIG. 7 is a diagram conceptually showing a process in a system according to the second embodiment of the present disclosure. When the brain-waves sensor device 200 attached to the user 11 detects intention of the user 11 to press down a start icon through the touch sensor 115, before the user 11 actually performs an operation input into the touch sensor 115, the system starts communication with a server device 300 in advance to transmit and receive necessary information. Then, when the operation input is actually performed into the touch sensor 115 by an indicator 12 of the user 11 (finger), continuation of the information transmitted and received in advance is transmitted and received continuously. This makes it possible to effectively utilize a time period from the brain's determination to perform the operation input until the actual contraction of a peripheral muscle and operation, and to reduce a time period from perception that the operation is completed until the process is completed.

Note that in the present embodiment, as shown in FIG. 7, a display 111 displays various icons for allowing the user to perform the operation input (start icon and setting icon) on the title screen. A memory 113 stores an icon table in which these icons are associated with details of the process.

FIG. 8 is a diagram conceptually showing the icon table stored in the memory 113 of the terminal device 100 according to the second embodiment of the present disclosure. Specifically, each icon displayed on the display 111 and the process to be performed by the operation input into each icon performed via the touch sensor 115 that is correspondingly placed are stored in the table. According to FIG. 8, in association with each icon ID information, drawing data information, placement coordinates information, and process information are stored. The drawing data information is information for determining a shape, color, size, and the like when the icon is displayed on the display. The placement coordinates information is information for determining the placement coordinates of the icon on the display. The process information is information for identifying details of the process to be started by performing the operation input into the icon. As one example, when the operation input is performed into the icon with the icon ID information of "I1", the terminal device 100 performs the process for "transmitting user information to the server device 300, and drawing the start screen on the display 111 based on information such as game data information received from the server device 300 and image data stored in the memory 113."

FIG. 9 is a diagram showing a process sequence to be executed among the terminal device 100, the brain-waves sensor device 200, and the server device 300 according to the second embodiment of the present disclosure. Specifically, FIG. 9 is an example of an operation input to be performed when the game application of "fighting game A" shown in FIG. 7 is activated in the terminal device 100 and the title screen is displayed. FIG. 9 shows an interrupt process sequence started when the brain-waves sensor device 200 detects intention of the user to perform the operation input and transmits the intention information generated based on the detection. Note that FIG. 9 cites an example of transmission and reception of information to and from the server device 300 to be performed by performing the operation input in the title screen of FIG. 7. However, this is just one example. That is, a situation to cause the user to perceive is not limited to an initial screen but may be other situations. Alternatively, a process in which the server device 300 is not involved may be performed, or a process in which other server devices or other terminal devices are involved may be performed.

In FIG. 9, when the initial screen is displayed, the user who has perceived this display determines into which icon of the start icon and a setting icon to perform the operation input. Then, as a result of the determination, the user determines an intention to touch the start icon and proceed to the start screen. In the meantime, the processor 213 of the brain-waves sensor device 200 monitors as required a feature of the waveform output from the brain-waves sensor 211 including the electrodes E1 to En (S21). Each time with reference to the operation identifying table shown in FIG. 4, the processor 213 determines agreement between the obtained feature and the feature of the operation input of the user sampled in advance. When there is no agreement, the processor 213 returns to the waveform monitoring process again.

On the other hand, when there is agreement about the feature, with reference to the detailed operation information associated with the agreed feature, the processor 213 identifies the detailed information about which the user is going to perform the operation input. In the present embodiment, as described above, since the intention to perform the operation input of touch on the start icon has been determined, the operation input ID information agrees with the feature of "O1." Therefore, the processor 213 performs control to generate the intention information including at least "O1" as the operation input ID information and to transmit the intention information (T21) to the terminal device 100 via an external communication interface 214.

Here, the operation input of the user into the touch sensor 115 is performed through the steps of first moving the indicator 12 (for example, finger), positioning, and touching. Therefore, typically, in a stage where the movement of the indicator 12 is completed, the indicator 12 is present on a position where the user wants to perform the operation input into the touch sensor 115 to some extent. In the present embodiment, using this state, the touch sensor 115 detects proximity coordinates of the indicator 12, and identifies a position the user is going to touch (S22). Next, the terminal device 100 identifies the icon placed at coordinates corresponding to the identified position (proximity coordinates) with reference to the icon table (FIG. 8). Then, the terminal device 100 starts the process associated with the identified icon (S23).

First, the terminal device 100 transmits user information (T22) stored in the memory 113 to the server device 300. Then, upon receipt of the user information, the server device 300 performs a process for authenticating the user (S24). When the user is authenticated as an authorized user of the game application of "fighting game A", the server device 300 transmits game data of the user (T23) stored in the server device 300 to the terminal device 100.

The terminal device 100 sequentially receives the game data transmitted from the server device 300 (S25). When the reception of the game data is completed, the terminal device 100 starts a drawing process for displaying the start screen on the display 111 by using the received game data and drawing information on the start screen stored in the memory 113 (S26).

Next, upon receipt of a touch detection interrupt from an input interface 114 (S27), with reference to the icon table (FIG. 8), the terminal device 100 identifies the icon placed at coordinates corresponding to contact coordinates detected by the input interface 114. Then, the terminal device 100 performs the process associated with the identified icon (S28). At this time, when the process identified from the proximity coordinates agrees with the process identified from the contact coordinates, the terminal device 100 performs the process of S28 using a result of the process that has already started in and after S23 as it is.

Note that the present embodiment has described a case where the input interface 114 receives the touch detection interrupt after S26. However, the interrupt can be received at any timing in and after S23. Therefore, for example, when the interrupt is received after S25, the process of S28 may be resumed from the middle of the reception of the game data.

FIG. 10 is a diagram showing a process flow to be executed by the terminal device 100 according to the second embodiment of the present disclosure. Specifically, the process flow is about the interrupt process to be started by receiving the intention information from the brain-waves sensor device 200.

According to FIG. 10, the process flow is started by determining that the processor 112 has received the intention information from the brain-waves sensor device 200 via an external communication interface 117 (S201). Here, the operation input of the user into the touch sensor 115 is performed through the steps of first moving the indicator 12 (for example, finger), positioning, and touching. Therefore, typically, in a stage where the movement of the indicator 12 is completed, the indicator 12 is present on a position where the user wants to perform the operation input into the touch sensor 115 to some extent. Therefore, upon receipt of the intention information, the processor 112 controls the touch sensor 115 to detect the proximity coordinates of the indicator 12 (finger) of the user (S202).

Figure 11A:
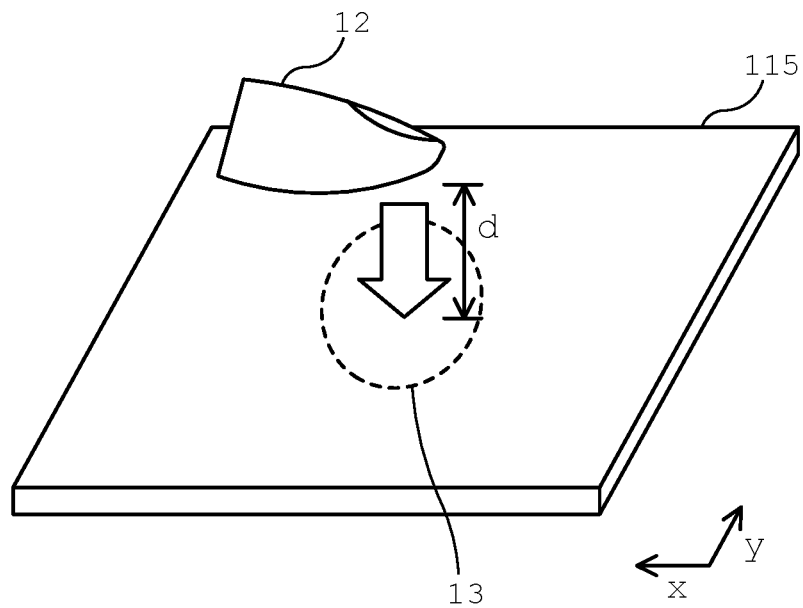
FIG. 11A is a diagram conceptually showing reception of an operation input by a touch sensor according to the second embodiment of the present disclosure. Further.
Figure 11B:
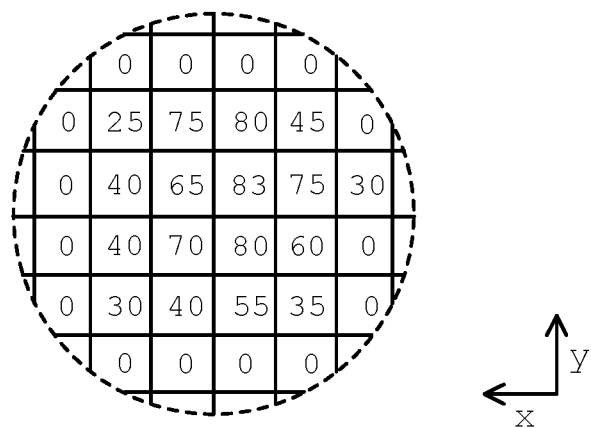
FIG. 11B is a diagram conceptually showing reception of the operation input by the touch sensor according to the second embodiment of the present disclosure.

Here, FIGS. 11A and 11B are diagrams conceptually showing reception of the operation input by the touch sensor 115 according to the second embodiment of the present disclosure. Specifically, FIG. 11A is a diagram showing a positional relationship between the indicator 12 of the user and the touch sensor 115 when the intention information is received. FIG. 11B is a diagram showing one example of capacitance values detected by the touch sensor 115 in the positional relationship of FIG. 11A (in a range of an area 13 of FIG. 11A). According to FIG. 11A, the indicator 12 is present at a position distant from the touch sensor 115 by distance d. At this time, according to FIG. 11B, the capacitance formed between x-axis electrodes and y-axis electrodes changes as the indicator 12 approaches. Relative values of amounts of the change are shown in FIG. 11B as the capacitance values. In the example of FIG. 11B, the coordinates position (x1, y1) where "83" is detected, which is the highest capacitance value, is detected as the proximity position of the indicator 12 in the case of FIG. 11A.

Returning to FIG. 10 again, with reference to the icon table (FIG. 8) stored in the memory 113, the processor 112 determines whether there is any icon at coordinates corresponding to the proximity coordinates (S203). When there is no icon, the operation input does not need any advance process using brain waves, and thus the processor 112 ends this process flow. On the other hand, when there is an icon, the processor 112 identifies operation information with reference to the process information in the icon table. The present embodiment will describe a case where the intention information about the operation input into the start icon shown in FIG. 7 (icon ID information="I1") is received. Therefore, when the proximity coordinates are within a range of the placement coordinates "C1", the processor 112 identifies the operation information as the operation on the icon with the icon ID information of "I1." Then, the processor 112 performs the process of "P1" (transmit the user information to the server device 300, and draw the start screen on the display 111 based on information such as the game data information received from the server device 300 and the image data stored in the memory 113). That is, in the present embodiment, before the user performs the actual operation input into the input interface, the processor 112 identifies the operation information by receiving the intention information from the brain-waves sensor device 200, and starts the process corresponding to this identified operation information in advance.

Specifically, the processor 112 first controls the external communication interface 117 to transmit the user information stored in the memory 113 to the server device 300 (S204). Then, after the server device 300 authenticates the user, the processor 112 controls the external communication interface 117 to start reception of the game data necessary for executing the game application (S205). Next, the processor 112 starts to draw the next screen (start screen) sequentially based on the received game data and drawing information stored in the memory 113.

Here, when the input interface 114 receives the actual operation input into the touch sensor 115 by the user, the input interface 114 transmits an interrupt signal including the contact coordinates where this operation input is performed. Upon receipt of the interrupt signal (S206), the processor 112 identifies the operation information with reference to the icon table (FIG. 8) based on the contact coordinates where the operation input is actually performed. The present embodiment will describe a case where the operation input into the start icon shown in FIG. 7 (icon ID information="I1") is actually performed. Therefore, when the contact coordinates where the operation input is performed are within a range of the placement coordinates "C1", the processor 112 identifies the operation information as an operation on the icon with the icon ID information of "I1."

At this time, the processor 112 determines whether the identified operation information agrees with the operation information identified by receiving the intention information (S207). As a result, when both are the operation for the icon with the icon ID information of "I1", the processor 112 determines whether there is any unacquired game data in the game data received in S205 (S208). When there is unacquired game data, the processor 112 controls the external communication interface 117 to receive the unacquired game data from the server device (S209). Then, by using both the game data received in advance based on the intention information and the game data received by actually performing the operation input, the processor 112 draws the next screen (start screen), and causes display of the display 111 to proceed to the next screen (S210).

On the other hand, when the operation information identified by the operation input into the input interface 114 does not agree with the operation information identified by receiving the intention information, the processor 112 determines whether the operation input into the input interface 114 is an operation input into another icon based on the detected contact coordinates (S211). Then, when it is determined that the operation input into the input interface 114 is an operation input into another icon, the processor 112 deletes the game data and the like received in advance using the intention information from the memory 113 (S212), and performs the process associated with another icon (S213).

On the other hand, when it is determined that the operation input into the input interface 114 is not an operation input into another icon, the processor 112 deletes the game data and the like received in advance using the intention information from the memory 113 (S214), and continues to display the current image on the display 111 as it is, without starting any special process (S215).

As described above, by detecting the intention of the user to perform the operation input by the brain-waves sensor device 200, the present embodiment makes it possible to start the process in the terminal device 100 in advance by using the time period from designing what the user operates on the terminal device 100 until the operation is completed, and to further reduce the time period from the moment when the operation input is actually performed into the terminal device until the process is completed.

Third Embodiment

The first and second embodiments have described a case where a brain-waves sensor device 200 detects brain waves of a user, compares the detected brain waves with brain waves of the user sampled in advance, and identifies intention information of the user. In a third embodiment, a signal obtained by performing processing such as analogue-to-digital (A/D) conversion on the brain waves of the user detected by electrodes E1 to En is transmitted to a terminal device 100, and a processor 112 of the terminal device 100 identifies intention information of the user. Note that the present embodiment is similar to the first or second embodiment in configuration, process, and procedure, except for items to be specifically described below. Therefore, detailed description of these items will be omitted.

In the present embodiment, as described above, since the processor 112 of the terminal device 100 identifies the intention information of the user, an operation identifying table shown in FIG. 4 is stored in a memory 113 of the terminal device 100. Then, between S11 and S12 of FIG. 5, whereas the intention information (T11) is received in the first embodiment, a brain-waves signal detected by a brain-waves sensor 211 is received in the present embodiment. Then, when the brain-waves signal is received, the processor 112 identifies the intention information of the user with reference to the operation identifying table stored in the memory 113. Then, based on the identified intention information of the user, the processor 112 performs the process based on the intention information as in the first or second embodiment. Subsequent processes are similar to the processes of the first embodiment.

As described above, by detecting the intention of the user to perform the operation input by the brain-waves sensor device 200, the present embodiment makes it possible to start the process in the terminal device 100 in advance by using the time period from designing what the user operates on the terminal device 100 until the operation is completed, and to further reduce the time period from the moment when the operation input is actually performed into the terminal device until the process is completed. Furthermore, since the processor of the terminal device 100 capable of performing higher-speed processing generates the intention information, it is possible to further speed up the process.

Others

In the second embodiment, the operation information indicating that the user is going to perform the operation input has been identified by detecting the proximity coordinates. However, it is not necessary to detect the proximity coordinates if the brain waves when the start icon of FIG. 7 is touched are sampled in advance, or the brain waves when the setting icon of FIG. 7 is touched are sampled, and if the operation identifying table is formed that allows distinction of not only "touch" but also "touch on what." That is, as the detailed operation information in the operation identifying table of FIG. 4, when it is possible to identify a position where the operation input is performed such as "touch on XX" and "long press on XX", the processor 112 can perform the process from which S102 and S103 of FIG. 9 are omitted.

The first to third embodiments have described a case of using the brain-waves sensor device 200. However, since it is required at least to detect the intention information of the user in the present disclosure, it is possible to implement the present disclosure by using not only the brain waves but also various signals. As one example, it is also possible to use a sensor device that can transmit the intention of the user from the brain to muscles and detect electric signals detected when the muscles move.

Note that it is also possible to construct the system by combining elements described in each embodiment as appropriate or replacing the elements.

The process and procedure described in this specification can be implemented by not only those explicitly described in the embodiments, but also software, hardware, or a combination of software and hardware. Specifically, the process and procedure described in this specification are implemented by mounting logic corresponding to the process in a medium such as an integrated circuit, a volatile memory, a nonvolatile memory, a magnetic disk, and an optical storage. The process and procedure described in this specification can be mounted as a computer program and executed by various computers including a terminal device and a server device.

Even if it is described that the process and procedure described in this specification are executed by a single device, software, component, or module, such a process or procedure can be executed by a plurality of devices, a plurality of software programs, a plurality of components, and/or a plurality of modules. Even if it is described that various information items described in this specification are stored in a single memory or storage unit, such information items can be stored in a distributed manner in a plurality of memories provided in a single device or a plurality of memories provided in a plurality of devices in a distributed manner. Furthermore, elements of software and hardware described in this specification can be implemented by integrating the elements in fewer components or by breaking the elements down into more elements.

The terminal device, program, method, and system being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A terminal device comprising:
an input interface configured to receive an operation input by a user;
a display configured to display a first game image and a second game image;
an external communication interface configured to receive intention information of the user who performs the operation input from a sensor device connected to the terminal device with a cable or wirelessly, the sensor device being configured to detect intention of the user with respect to the operation input, the external communication interface being configured to transmit and receive predetermined information to and from a remotely installed server device, the predetermined information including first predetermined information and second predetermined information;
a memory configured to store computer-readable instructions, a game application, first game data, and second game data; and
a processor configured to execute the computer-readable instructions so as to:
start the game application to display the first game image on the display by using the first game data stored in the memory;
identify the operation input which the user is going to perform based on the intention information received from the sensor device via the external communication interface before the input interface receives the operation input;
start a first process in which the first predetermined information is transmitted from the terminal device to the server device in response to the identified operation input and in which the second predetermined information from the server device is received by the terminal device in response to the first predetermined information, the second predetermined information including third game data, the first process partially displaying the second game image on the display by using the second game data stored in the memory and the third game data received from the server device, the second game image being a next scene of the first game image in the game application; and
perform a second process corresponding to the operation input received by the input interface by using the second predetermined information relating to the already started first process corresponding to the identified operation input when the input interface receives the operation input, the second process displaying the second game image on the display by using the second game data and the third game data when the identified operation input matches the operation input received by the input interface,
wherein the processor is configured to start the first process before the input interface receives the operation input by the user.

2. The terminal device according to claim 1,
wherein, when the identified operation input does not match the operation input received by the input interface, the processor is configured to delete the third data received from the server device and start a third process corresponding to the operation input received by the input interface.

3. The terminal device according to claim 1,
wherein the input interface detects proximity coordinates and contact coordinates of an indicator of the user.

4. The terminal device according to claim 3,
wherein the intention information relates to intention to cause the indicator of the user to contact the input interface.

5. The terminal device according to claim 3,
wherein the identified operation input is identified based on the proximity coordinates of the indicator detected by the input interface, and
the operation input received by the input interface is identified based on the contact coordinates of the indicator detected by the input interface.

6. The terminal device according to claim 1,
wherein the sensor device includes one or more electrodes for detecting brain waves of the user.

7. The terminal device according to claim 1,
wherein, when the identified operation input matches the operation input received by the input interface, the processor is configured to determine whether additional game data is required to display an entirety of the second game image on the display, and
when the processor determines that the additional game data is required, the processor is configured to receive the additional game data from the server device and display the entirety of the second game image on the display by using the second game data, the third game data, and the additional game data.

8. A computer program product embodying computer-readable instructions stored on a non-transitory computer readable medium for causing a computer to execute a process by a processor, the computer including:
an input interface configured to receive an operation input by a user;
a display configured to display a first game image and a second game image;
a memory configured to store a game application, first game data, and second game data; and
an external communication interface configured to receive intention information of the user who performs the operation input from a sensor device connected with a cable or wirelessly, the sensor device being configured to detect intention of the user with respect to the operation input, the external communication interface being configured to transmit and receive predetermined information to and from a remotely installed server device, the predetermined information including first predetermined information and second predetermined information,
the computer configured to perform the steps of:
starting the game application to display the first game image on the display by using the first game data stored in the memory;
identifying the operation input which the user is going to perform based on the intention information received from the sensor device via the external communication interface before the input interface receives the operation input;

starting a first process in which the first predetermined information is transmitted from the computer to the server device in response to the identified operation input and in which the second predetermined information from the server device is received by the computer in response to the first predetermined information, the second predetermined information including third game data, the first process partially displaying the second game image on the display by using the second game data stored in the memory and the third game data received from the server device, the second game image being a next scene of the first game image in the game application; and performing a second process corresponding to the operation input received by the input interface by using the second predetermined information relating to the already started first process corresponding to the identified operation input when the input interface receives the operation input, the second process displaying the second game image on the display by using the second game data and the third game data when the identified operation input matches the operation input received by the input interface, wherein the processor is configured to start the first process before the input interface receives the operation input by the user.

9. The computer program product according to claim 8, wherein, when the identified operation input matches the operation input received by the input interface, the processor is configured to determine whether additional game data is required to display an entirety of the second game image on the display, and when the processor determines that the additional game data is required, the processor is configured to receive the additional game data from the server device and display the entirety of the second game image on the display by using the second game data, the third game data, and the additional game data.

10. A method for causing a processor in a computer to execute computer-readable instructions stored in a memory, the memory being configure to store a game application, first game data, and second game data, the computer including:
an input interface configured to receive an operation input by a user;
a display configured to display a first game image and a second game image; and
an external communication interface configured to receive intention information of the user who performs the operation input from a sensor device connected with a cable or wirelessly, the sensor device being configured to detect intention of the user with respect to the operation input, the external communication interface being configured to transmit and receive predetermined information to and from a remotely installed server device, the predetermined information including first predetermined information and second predetermined information, the method comprising executing the computer-readable instructions on the processor the steps of:
starting the game application to display the first game image on the display by using the first game data stored in the memory;
identifying the operation input which the user is going to perform based on the intention information received from the sensor device via the external communication interface before the input interface receives the operation input;

starting a first process in which the first predetermined information is transmitted from the computer to the server device in response to the identified operation input and in which the second predetermined information from the server device is received by the computer in response to the first predetermined information, the second predetermined information including third game data, the first process partially displaying the second game image on the display by using the second game data stored in the memory and the third game data received from the server device, the second game image being a next scene of the first game image in the game application; and performing a second process corresponding to the operation input received by the input interface by using the second predetermined information relating to the already started first process corresponding to the identified operation input when the input interface receives the operation input, the second process displaying the second game image on the display by using the second game data and the third game data when the identified operation input matches the operation input received by the input interface, wherein the processor is configured to start the first process before the input interface receives the operation input by the user.

11. The method according to claim 10,
wherein, when the identified operation input matches the operation input received by the input interface, the processor is configured to determine whether additional game data is required to display an entirety of the second game image on the display, and when the processor determines that the additional game data is required, the processor is configured to receive the additional game data from the server device and display the entirety of the second game image on the display by using the second game data, the third game data, and the additional game data.

12. A system comprising:
a terminal device, the terminal device including:
an input interface configured to receive an operation input by a user;
a display configured to display a first game image and a second game image;
an external communication interface configured to receive intention information of the user who performs the operation input;
a sensor device connected to the terminal device with a cable or wirelessly, the sensor device being configured to detect intention of the user with respect to the operation input and send the intention information of the user to the terminal device through the external communication interface;
a server device that is remotely installed from the terminal device, the terminal device is configured to transmit and receive predetermined information to and from the server device through the external communication interface, the predetermined information including first predetermined information and second predetermined information;
a memory configured to store computer-readable instructions, a game application, first game data, and second game data; and a processor configured to execute the computer-readable instructions so as to:
  start the game application to display the first game image on the display by using the first game data stored in the memory;
  identify the operation input which the user is going to perform based on the intention information received from the sensor device via the external communication interface before the input interface receives the operation input;
  start a first process in which the first predetermined information is transmitted from the terminal device to the server device in response to the identified operation input and in which the second predetermined information from the server device is received by the terminal device in response to the first predetermined information, the second predetermined information including third game data, the first process partially displaying the second game image on the display by using the second game data stored in the memory and the third game data received from the server device, the second game image being a next scene of the first game image in the game application; and
  perform a second process corresponding to the operation input received by the input interface by using the second predetermined information relating to the already started first process corresponding to the identified operation input when the input interface receives the operation input, the second process displaying the second game image on the display by using the second game data and the third game data when the identified operation input matches the operation input received by the input interface,
  wherein the processor is configured to start the first process before the input interface receives the operation input by the user.

13. The system according to claim 12,
wherein, when the identified operation input matches the operation input received by the input interface, the processor is configured to determine whether additional game data is required to display an entirety of the second game image on the display, and
when the processor determines that the additional game data is required, the processor is configured to receive the additional game data from the server device and display the entirety of the second game image on the display by using the second game data, the third game data, and the additional game data.

14. A terminal device comprising:
an input interface configured to receive an operation input by a user;
a display configured to display a first game image and a second game image;
an external communication interface configured to receive a signal indicating intention of the user with respect to the operation input, the signal being detected by one or more electrodes connected to the terminal device with a cable or wirelessly, the external communication interface being configured to transmit and receive predetermined information to and from a remotely installed server device, the predetermined information including first predetermined information and second predetermined information;
a memory configured to store computer-readable instructions, correspondence between the signal and the intention of the user, a game application, first game data, and second game data; and
a processor configured to execute the computer-readable instructions so as to:
  start the game application to display the first game image on the display by using the first game data stored in the memory;
  generate intention information of the user from the received signal and the correspondence stored in the memory before the input interface receives the operation input;
  identify the operation input which the user is going to perform based on the generated intention information;
  start a first process in which the first predetermined information is transmitted from the terminal device to the server device in response to the identified operation input and in which the second predetermined information from the server device is received by the terminal device in response to the first predetermined information, the second predetermined information including third game data, the first process partially displaying the second game image on the display by using the second game data stored in the memory and the third game data received from the server device, the second game image being a next scene of the first game image in the game application; and
  perform a second process corresponding to the operation input received by the input interface by using the second predetermined information relating to the already started first process corresponding to the identified operation input when the input interface receives the operation input, the second process displaying the second game image on the display by using the second game data and the third game data when the identified operation input matches the operation input received by the input interface,
  wherein the processor is configured to start the first process before the input interface receives the operation input by the user.

15. The terminal device according to claim 14,
wherein, when the identified operation input matches the operation input received by the input interface, the processor is configured to determine whether additional game data is required to display an entirety of the second game image on the display, and
when the processor determines that the additional game data is required, the processor is configured to receive the additional game data from the server device and display the entirety of the second game image on the display by using the second game data, the third game data, and the additional game data.

* * * * *